(12) United States Patent
Guerret et al.

(10) Patent No.: US 9,598,523 B2
(45) Date of Patent: Mar. 21, 2017

(54) MACROMONOMERS IMPROVING THE THERMAL STABILITY OF (METH)ACRYLIC COMB POLYMERS, USE OF THESE POLYMERS IN LOADED PLASTIC COMPOSITIONS

(75) Inventors: Olivier Guerret, La Tour de Salvagny (FR); Jacques Mongoin, Quincieux (FR); Patrick Trouve, Clamart (FR)

(73) Assignee: COATEX S.A.S., Genay (FR)

( * ) Notice: Subject to any disclaimer, the term of this patent is extended or adjusted under 35 U.S.C. 154(b) by 575 days.

(21) Appl. No.: 12/641,921

(22) Filed: Dec. 18, 2009

(65) Prior Publication Data

US 2010/0174012 A1    Jul. 8, 2010

Related U.S. Application Data

(60) Provisional application No. 61/145,351, filed on Jan. 16, 2009.

(30) Foreign Application Priority Data

Dec. 18, 2008  (FR) .................................... 08 58748

(51) Int. Cl.
| | | |
|---|---|---|
| *C08K 5/00* | (2006.01) | |
| *C08K 5/16* | (2006.01) | |
| *C08K 5/09* | (2006.01) | |
| *C08K 3/10* | (2006.01) | |
| *C08K 3/22* | (2006.01) | |
| *C08K 3/26* | (2006.01) | |
| *C08K 3/18* | (2006.01) | |
| *C08L 67/00* | (2006.01) | |
| *C08L 77/00* | (2006.01) | |
| *C08L 61/06* | (2006.01) | |
| *C08L 63/00* | (2006.01) | |
| *C08F 290/06* | (2006.01) | |

(Continued)

(52) U.S. Cl.
CPC .......... *C08F 290/062* (2013.01); *C08L 27/06* (2013.01); *C08L 51/08* (2013.01)

(58) Field of Classification Search
CPC ....... C08F 290/062; C08L 27/06; C08L 51/08
USPC ........ 523/457, 458; 524/186, 284, 294, 413, 524/425, 431, 437; 525/453, 420, 418, 525/480, 534, 540, 533
See application file for complete search history.

(56) References Cited

U.S. PATENT DOCUMENTS

| 6,258,162 B1* | 7/2001 | Kawakami ..........  C04B 24/2647 106/724 |
| --- | --- | --- |
| 6,946,510 B2* | 9/2005 | Suau et al. .................... 524/425 |
| 7,189,015 B2* | 3/2007 | Sasayama .................... 396/578 |

(Continued)

FOREIGN PATENT DOCUMENTS

| WO | 2007/052122 A1 | 5/2007 |
| WO | 2008/053296 A2 | 5/2008 |

*Primary Examiner* — David Karst
(74) *Attorney, Agent, or Firm* — Oblon, McClelland, Maier & Neustadt, L.L.P.

(57) ABSTRACT

The invention concerns to the use, as an agent improving the thermal stability of (meth)acrylic comb polymers of a macromonomer whose formula (I) is:

$$R-(A-O)_m-(B-O)_n-R' \qquad (I)$$

wherein both m and n are non-zero and A and B designate alkyl groups having 2 to 4 carbon atoms, but different from one another. The invention further pertains to the implementation of the polymers obtained, as agents improving the thermal stability of the plastic compositions that contain them.

16 Claims, 9 Drawing Sheets

(51) Int. Cl.
 *C08L 27/06* (2006.01)
 *C08L 51/08* (2006.01)

(56) References Cited

U.S. PATENT DOCUMENTS

2002/0111429 A1    8/2002  Yasumura et al.
2006/0106186 A1*   5/2006  Dupont et al. ................. 528/25
2009/0270543 A1*  10/2009  Mongoin et al. ............. 524/426

* cited by examiner

MACROMONOMERS IMPROVING THE THERMAL STABILITY OF (METH)ACRYLIC COMB POLYMERS, USE OF THESE POLYMERS IN LOADED PLASTIC COMPOSITIONS

DISCUSSION OF THE BACKGROUND

Plastic materials are used in numerous manufactured objects, because their injection, pressing, moulding, or calendering conversion methods make them easy to implement. These materials, made up of a resin, very often have a mineral or organic load added to them. One of the functions of said load is to substitute for the generally expensive resin, thereby making it possible to lower the material's overall cost.

These loads are numerous, such as talc, alumina, titanium dioxide, magnesium oxide, barium sulfate, aluminium, silica, kaolin, or natural or synthetic calcium carbonate, as indicated in the document JP 50-028105, which describes rigid materials obtained by mixing one or more of these loads with PVC.

These loads also make it possible to improve some of the final part's mechanical properties. For example, calcium carbonate makes it possible to improve the rigidity of PVC, its cooling time during extrusion, or its die build-up. This is particularly described in the document "The use of calcium carbonate to enhance the physical properties of rigid vinyl products" (Society of Plastic Engineering, Conf., 12-14 Oct. 1999).

Conventionally, the mineral or organic load is added to the plastic resin in the form of a dry powder. Said powder may result from a step of dry milling, or a step of wet-milling followed by drying, as this powder can even be treated before being added to the resin. Furthermore, numerous additives may also be added to this type of formula, such as impact modifiers, compatibilizing agents, thermal stabilizers, a lubricant, a rheology modifier, etc.

To that end, certain chemical additives with a very particular structure have for the past few years been the subject of increasing interest from formulators of loaded plastic compositions: they are (meth)acrylic comb copolymers. This expression refers to a copolymer made up of an essentially linear skeleton that is (meth)acrylic by nature, onto which are grafted at least two side segments made up of at least one "macromonomer". The term "macromonomer" refers to a polymer or copolymer that has at least one terminal group with an unsaturated ethylenic function.

In this manner, the document WO 2007/052122 demonstrates that such copolymers, implemented in loaded thermoplastic or heat-setting formulas, make it possible to improve their impact resistance without altering their rigidity. In loaded formulas and chlorinated resin-based formulas, these copolymers behave like highly effective compatibilizing agents with respect to calcium carbonate: this is the subject of the document WO 2008/053296, which discloses that the dispersion state of the load is improved in the resin, which leads to improved optical and mechanical properties. Finally, the document WO 2008/107787 describes the rheology-modifying function of such copolymers, which advantageously make it possible to reduce the viscosity of calcium carbonate-loaded PVC resins.

According to the teachings of the three aforementioned documents, these comb copolymers are obtained by causing a monomer, which is (meth)acrylic acid, to react with a macromonomer whose formula (I) is:

$$R\text{-}(A\text{-}O)_m\text{---}(B\text{---}O)_n\text{---}R' \quad (I)$$

In this formula, m and n are whole numbers, at least one of which is non-zero, A and B refer to alkyl groups with 2 to 4 carbon atoms, R refers to a polymerizable unsaturated function, and R' represents hydrogen or an alkyl group with 1 to 40 carbon atoms.

The production of such macromonomers is well-known to the person skilled in the art, who may, for example, refer to the document U.S. Pat. No. 6,034,208. By the chain $-(A\text{-}O)_m\text{---}(B\text{---}O)_n\text{---}$, the Applicant is referring to both a statistical distribution as one in the form of blocks of A-O and B—O units.

However, the Applicant has been able to show that a particular class of these copolymers, entirely advantageously and surprisingly, do resolve a fundamental technical problem inherent in the methods for converting loaded plastic formulas. This problem is that of the thermal stability of said formulas, as these formulas are intended to undergo operations of conversion through injection, pressing, molding, or calendering, generally at high temperatures.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein:

FIG. 9 is a graphical representation showing the so-called induction periods in minutes (in black) and stability for the loaded plastics according to tests B (2 rectangles on the left)

and C (2 rectangles on the right) until a value set to 50µ-Siemens conductivity (in white) is reached.

DETAILED DESCRIPTION OF THE PREFERRED EMBODIMENTS

It is easily understood that the thermal stability of these compositions, at the temperatures at which they are implemented, constitutes an essential parameter. It is also obvious that, if the loaded plastic formulation contains an additive that may degrade under the effects of temperature, the very stability of said formula, and therefore its cohesion, could be affected.

While pursuing her research into optimizing the temperature-resistance properties of the (meth)acrylic comb copolymers of the prior art, the Applicant has been able to identify among these compounds a particular class of chemicals with an entirely surprising temperature resistance. They are copolymers derived from the reaction between a (meth) acrylic monomer and a macromonomer with formula (I), in which both m and n are non-zero and A and B refer to alkyl groups with 2 to 4 carbon items, but which are different from one another. In other words, the Applicant has been able to demonstrate that the simultaneous presence of oxyalkylated groups which are different from one another within the macromonomer with formula (I) is what improves the thermal stability of the final copolymer.

Nothing had implied that such a result would be possible. Indeed, documents WO 2007/052122, WO 2008/053296 and WO 2008/107787 only described oxyethylated groups for the macromonomer with formula (I): they therefore contained no instruction regarding the possible role played by oxyalkylated links of different natures within said macromonomer. Entirely surprisingly, and extremely noteworthy compared with the (meth)acrylic comb copolymers of the prior art, the copolymers of the present invention exhibit heretofore unreached thermal decomposition temperatures: these temperatures are more than 100° C. greater than the prior art.

The function played by said inventive macromonomer is that of improving the temperature-stability of the (meth) acrylic comb copolymer, derived from copolymerizing that macromonomer with a (meth)acrylic monomer. The resulting comb polymer is then implemented to process/disperse/grind a mineral or organic load, and is then incorporated via that load in the form of a dry powder, into the plastic resin.

Without likening it to a person skilled in the art calls a thermal stabilizer, the Applicant nonetheless presumes that said comb copolymer provides the new function of improving the thermal stability of the plastic material into which it is incorporated, by the following definition: all other things being equal, the inventive comb copolymer improves the thermal stability of the plastic material compared with an identical plastic formulation containing a comb copolymer of the prior art. The risk of thermally degrading the comb copolymer within the plastic material is therefore limited: the risk of degrading the material itself is therefore also reduced.

Thus, a first object of the invention consists of the use, within a method for manufacturing a (meth)acrylic comb copolymer through copolymerization between:
a) a (meth)acrylic monomer,
b) and an oxyalkylated monomer having at least one ethylenic unsaturated function, as an agent improving the stability of said copolymer, a macromonomer characterized in that it fulfills the formula (I):

$$R\text{-}(A\text{-}O)_m\text{---}(B\text{---}O)_n\text{---}R' \qquad (I)$$

with:
m and n are non-zero whole numbers less than 150,
A and B refer to alkyl groups that are different from one another, distributed in a block or statistical fashion, and preferentially statistical, and having 2 to 4 carbon atoms, group A preferentially designating the group $CH_2\text{---}CH_2$ and group B preferentially designating the group $CH_2\text{---}CH\text{---}CH_3$,
R designates a polymerizable unsaturated function,
R' represents hydrogen or an alkyl group having 1 to 40 carbon atoms, preferentially hydrogen or the methyl radical.

This use of a macromonomer within a method for manufacturing a copolymer is further characterized in that said method implements, in comparison to the total weight of the comb copolymer, said total being equal to 100:
a) from 0.5% to 50%, preferentially from 1% to 25%, and very preferentially from 5% to 20%, of at least one monomer which is (meth)acrylic acid,
b) from 50% to 99.5%, preferentially from 75% to 99%, and very preferentially from 80% to 95%, of at least one macromonomer with the formula (I):

$$R\text{-}(A\text{-}O)_m\text{---}(B\text{---}O)_n\text{---}R' \qquad (I)$$

with:
m and n are non-zero whole numbers less than 150,
A and B refer to alkyl groups that are different from one another, distributed in a block or statistical fashion, and preferentially statistical, and having 2 to 4 carbon atoms, group A preferentially designating the group $CH_2\text{---}CH_2$ and group B preferentially designating the group $CH_2\text{---}CH\text{---}CH_3$,
R designates a polymerizable unsaturated function,
R' represents hydrogen or an alkyl group having 1 to 40 carbon atoms, preferentially hydrogen or the methyl radical,
c) from 0% to 50% of at least one monomer chosen from among (meth)acrylic anhydride, (meth)acrylamide, (meth)acrylic esters, hydroxylated methacrylates, aromatic vinylic monomers, organophosphates, and mixtures thereof.

This use of a macromonomer in a method for manufacturing a copolymer is further characterized in that said method takes place continuously, semi-continuously, or in batches. Examples of such methods may particularly be found in documents U.S. Pat. No. 6,815,513, U.S. Pat. No. 6,214,958, U.S. Pat. No. 664,360, U.S. Pat. No. 7,232,875.

This use of a macromonomer in a method for manufacturing a copolymer is further characterized in that said method consists of radical polymerization in a solution, in a direct or reverse emulsion, in a suspension or precipitation in solvents, in the presence of catalytic systems and transfer agents, or of controlled radical polymerization, and preferentially nitroxide-mediated polymerization (NMP) or cobaloxime-mediated polymerization, atom transfer radical polymerization (ATRP), or sulfur derivative-mediated radical polymerization, said derivatives being chosen from among carbamates, dithioesters or trithiocarbonates (RAFT) or xanthates.

This use of a macromonomer in a method for manufacturing a copolymer is further characterized in that said method comprises a step of fully or partially neutralizing said copolymer by one or more neutralization agents having a monovalent or polyvalent cation, said agents preferentially being chosen from among ammonia or from among calcium or magnesium hydroxides and/or oxides, or from among sodium, potassium, or lithium hydroxides, or from among alphatic and/or cyclic primary, secondary, and tertiary amines, preferentially such as stearylamine, ethanolamines (mono-di, triethanolamine), mono- and diethylamine, cyclohexylamine, methylcyclohexylamine, methyl propanal amino, morpholine, and preferentially in that the neutralization agent is sodium hydroxide.

This use of a macromonomer in a method for manufacturing a copolymer is further characterized in that said method comprises a step of distilling and separating said copolymer in multiple phases, using static or dynamic methods, by one or more polar solvents preferentially belonging to the group made up of water, methanol, ethanol, propanol, isopropanol, butanols, acetone, tetrahydrofurane, or mixtures thereof.

A further object of the invention consists of the use, in a method for manufacturing a loaded plastic material, as an agent improving the thermal stability of said material, of a (meth)acrylic comb polymer made up:
a) of a (meth)acrylic monomer,
b) of a macromonomer characterized in that it fulfills the formula (I):

with:
m and n are non-zero whole numbers less than 150,
A and B refer to alkyl groups that are different from one another, distributed in a block or statistical fashion, and preferentially statistical, and having 2 to 4 carbon atoms, group A preferentially designating the group $CH_2$—$CH_2$ and group B preferentially designating the group $CH_2$—$CH$—$CH_3$,
R designates a polymerizable unsaturated function,
R' represents hydrogen or an alkyl group having 1 to 40 carbon atoms, preferentially hydrogen or the methyl radical.

This use of a copolymer in a method for manufacturing a loaded plastic material is further characterized in that said comb copolymer is made up, expressed as a percentage by weight of each of its components, the total being equal to 100, of:
a) from 0.5% to 50%, preferentially from 1% to 25%, and very preferentially from 5% to 20%, of at least one monomer which is (meth)acrylic acid,
b) from 50% to 99.5%, preferentially from 75% to 99%, and very preferentially from 80% to 95%, of at least one macromonomer with the formula (I):

with:
m and n are non-zero whole numbers less than 150,
A and B refer to alkyl groups that are different from one another, distributed in a block or statistical fashion, and preferentially statistical, and having 2 to 4 carbon atoms, group A preferentially designating the group $CH_2$—$CH_2$ and group B preferentially designating the group $CH_2$—$CH$—$CH_3$,
R designates a polymerizable unsaturated function,
R' represents hydrogen or an alkyl group having 1 to 40 carbon atoms, preferentially hydrogen or the methyl radical,
c) from 0% to 50% of at least one monomer chosen from among (meth)acrylic anhydride, (meth)acrylamide, (meth)acrylic esters, hydroxylated methacrylates, aromatic vinylic monomers, organophosphates, and mixtures thereof.

This use of a copolymer in a method for manufacturing a loaded plastic material is further characterized in that said copolymer is obtained by radical polymerization in a solution, in a direct or reverse emulsion, in a suspension or precipitation in solvents, in the presence of catalytic systems and transfer agents, or by controlled radical polymerization methods, and preferentially by nitroxide-mediated polymerization (NMP) or cobaloxime-mediated polymerization, atom transfer radical polymerization (ATRP), or sulfur derivative-mediated radical polymerization, said derivatives being chosen from among carbamates, dithioesters or trithiocarbonates (RAFT) or xanthates.

This use of a copolymer in a method for manufacturing a loaded plastic material is further characterized in that said copolymer is fully or partially neutralized by one or more neutralization agents having a monovalent or polyvalent cation, said agents preferentially being chosen from among ammonia or from among calcium or magnesium hydroxides and/or oxides, or from among sodium, potassium, or lithium hydroxides, or from among alphatic and/or cyclic primary, secondary, and tertiary amines, preferentially such as stearylamine, ethanolamines (mono-di, triethanolamine), mono- and diethylamine, cyclohexylamine, methylcyclohexylamine, methyl propanal amino, morpholine, and preferentially in that the neutralization agent is chosen from among triethanolomine and sodium hydroxide.

This use of a copolymer in a method for manufacturing a loaded plastic material is further characterized in that said copolymer is distilled and separated in multiple phases, using static or dynamic methods, by one or more polar solvents preferentially belonging to the group made up of water, methanol, ethanol, propanol, isopropanol, butanols, acetone, tetrahydrofurane, or mixtures thereof.

This use of a copolymer in a method for manufacturing a loaded plastic material is further characterized in that said copolymer implements 0.05% to 5%, preferentially 0.1% to 3%, and very preferentially 0.1% to 1% of said copolymer by dry weight, in comparison to the dry weight of the load.

This use of a copolymer in a method for manufacturing a loaded plastic material is further characterized in that said method comprises at least one step of incorporating said copolymer into the loaded plastic material:
1. in the form of a dry powder, resulting from the steps of:
    grinding and/or dispersing the load in an aqueous medium in the presence of said polymer, and potentially in the presence of at least one other wet-grinding agent and/or at least one other dispersing agent,
    drying the obtained dispersion and/or aqueous suspension of mineral or carbonated material, potentially adding said polymer, processing and then potentially classifying the obtained powder,
2. and/or in the form of a dry powder, resulting from the steps of:
    dry-grinding the load in the presence of said polymer, and potentially in the presence of at least one other dry grinding agent,
    processing and potentially classifying the obtained powder,
3. and/or in the form of a dry powder, resulting from the following steps:
    adding said polymer into a dispersion and/or into an aqueous suspension containing the load,
    drying the dispersion and/or aqueous suspension of the load, potentially adding said polymer, processing and then potentially classifying the obtained powder, 4. and/or in the form of a dry powder resulting from drying said copolymer, 5. and/or in the form of a dry powder, resulting from the following steps:

adding said copolymer into a suspension and/or emulsion of at least one additive chosen from among a thermal stabilizer and/or a UV stabilizer and/or a lubricant and/or a rheology modifier and/or an impact modifier that is organic in nature, drying the obtained suspension and/or emulsion, potentially in the presence of said copolymer, and then potentially classifying the obtained powder.

This use of a copolymer in a method for manufacturing a loaded plastic material is further characterized in that the load is a mineral or organic load, preferentially mineral, said load if mineral being chosen from among natural or synthetic calcium carbonate, dolomites, limestone, kaolin, talc, titanium dioxide, aluminium trihydroxide, mica, carbonblack, and silica, and in that it is preferentially chosen from among natural or synthetic calcium carbonate, and in that it is most preferentially a natural calcium carbonate.

This use of a copolymer in a method for manufacturing a loaded plastic material is further characterized in that the plastic material is made up of at least one plastic resin, chosen from among thermoplastic resins and heat-setting resins.

This use of a copolymer in a method for manufacturing a loaded plastic material is further characterized in that the thermoplastic resin is chosen from among halogenated resins, and preferentially from among PVC, chlorinated polyvinyl chloride (CPVC), poly(vinylidene fluoride) (PVDF), or chosen from among styrenic resins, and preferentially from among high-impact styrene-butadine (HIPS), Kraton™ copoymer blocks, styrene-acrylonitrile resins, les acrylate-butadiene-styrene resins, methylmethacrylate styrene copolymers, or chosen from among acrylic resins, and preferentially from among methyl polymethacrylate, or chosen from among polyolefines, and preferentially from among polyethylenes or polypropylenes, or chosen from among polycarbonate resins, or chosen from among unsaturated polyester resins, and preferentially from among polyethylene terephthalate and polybutylene terephthalate, or chosen from among polyurethane resins, or chosen from among polyamide resins, or the mixture of these resins, and preferentially in that the thermoplastic resin is chosen from among halogenated resin, and preferentially from among PVC, chlorinated polyvinyl chloride (PVCC), poly(vinylidene fluoride) (PVDF), or acrylic resins, and preferentially from among methyl poly methacrylate, or chosen from among polycarbonate resins, or chosen from among unsaturated polyester resins, and preferentially from among terephthalate polyethylene and terephthalate polybutylene, and very preferentially in that this thermoplastic resin is PVC.

This use of a copolymer in a method for manufacturing a loaded plastic material is further characterized in that the heat-setting resin is chosen from among acrylic resins, phenoplasts, aminoplasts, ethoxinlines, preferentially including epoxides, unsaturated polyesters, polyurethanes, and alkyds.

The following examples make it possible to better understand the content of the invention, though without limiting its scope.

EXAMPLES

In all of the examples, the molecular weight and polymolecularity indices of the polymers used are determined according to the method described below, by multi-detection steric exclusion chromatography (SEC 3D).

The SEC 3D Chain is Made Up of:

an ERC 3112 inline degasser for a moving phase, a Waters 515 or Viscotek VE1121 isocratic pump, a Waters 717+ automatic injector, a Waters CHM column heater, a set of three Waters Ultrahydrogel columns 30 cm in length and 7.8 mm in internal diameter, one linear column followed by two 120 Å, the whole assembly being preceded by a guard column of the same sort, An assembly of detectors connected in parallel: a Viscotek T60A LS-visco dual detector and a Waters 2410 differential refractometer, a computer and software system: Viscotek TriSEC 3.0 GPC software.

Composition of the Mobile Phase:

Preparing a parent solution: $Na_2SO_4$ 666 mM, filtered at 0.1 µm,

Preparing the mobile phase at 66.6 mM of $Na_2SO_4$ (i.e. an ionic force of 0.2 M):

10% by volume of the aforementioned parent solution,

5% by volume of acetonitrile,

85% by volume of water at 18.2 MO, pH adjusted to 9.0 by a few drops of sodium N.

Operational Parameters:

flow rate: 0.8 ml/min,

Temperature of the columns and the refractometer: 40° C., injection volume: 100 µl concentration of polymers at injection: 2 to 4 mg/ml depending on the expected average molar mass for each sample (optimisation of detectors' responses), duration of analysis: 50 min.

Calibrating the Detectors:

Use of Two Certified Masters:

Viscotek PEO22k, a low polymolecularity-index master for calibrating the system, Viscotek Dextran T70k, a high-index master for verifying and refining the sample.

Example 1

This example illustrates resistance to thermal degradation, as measured by thermogravimetric analysis, for inventive comb copolymers and for comb copolymers of the prior art.

To do so, we begin by drying the copolymer, which is then reduced to powder using a spatula and then a mortar.

The thermogravimetric measurement and then taken in air with a flow rate of 60 ml/min with a thermobalance sold by TA INSTRUMENTS as product code Q500.

The loss of mass is determined using the high dynamic resolution technique. The parameters are a temperature ramp-up by 30° C./min from 30° C. to 600° C., sensitivity is equal to 1, and resolution is equal to 4. The gas flow rate during the measurement is 40 ml/min for nitrogen and 60 ml/min for air. The masses used are between 10 and 24 mg. The change in percentage of the sample's remaining mass (in comparison to its initial mass) as a function of temperature is then recorded.

Test No. 1

This test implements a comb copolymer of the prior art, whose molecular weight is equal to 65,000 g/mol and whose polymolecularity index is equal to 1.9, fully neutralized by sodium, and made up of, expressed as a percentage by weight of each of its components:
10% acrylic acid,
90% by weight of a macromonomer whose formula is (I) in which R represents the methacrylate group, R' represents the methyl radical, m=113, n=0, A designates the group $CH_2$—$CH_2$, the molecular weight of said macromonomer being equal to 5,000 g/mol.

Test No. 2

This test implements a comb copolymer of the prior art, whose molecular weight is equal to 55,000 g/mol and whose polymolecularity index is equal to 1.7, fully neutralized by sodium, and made up of, expressed as a percentage by weight of each of its components:
10% acrylic acid,
90% by weight of a macromonomer whose formula is (I) in which R represents the methacrylate group, R' represents the methyl radical, m=66, n=0, and A designates the group $CH_2$—$CH_2$, the molecular weight of said macromonomer being equal to 3,000 g/mol.

Test No. 3

This test implements a comb copolymer of the prior art, whose molecular weight is equal to 72,000 g/mol and whose polymolecularity index is equal to 2.2, fully neutralized by sodium, and made up of, expressed as a percentage by weight of each of its components:
6% acrylic acid, 4% methacrylic acid,
90% by weight of a macromonomer whose formula is (I) in which R represents the methacrylate group, R' represents the methyl radical, m=44, n=0, and A designates the group $CH_2$—$CH_2$, the molecular weight of said macromonomer being equal to 2,000 g/mol.

Test No. 4

This test implements an inventive comb copolymer, whose molecular weight is equal to 70,000 g/mol and whose polymolecularity index is equal to 2.2, fully neutralized by sodium, and made up of, expressed as a percentage by weight of each of its components:
10% acrylic acid,
90% by weight of a macromonomer whose formula is (I) in which R represents the methacrylate group, R' represents hydrogen, m=42, n=18, and A designates the group $CH_2$—$CH_2$ and B designates the group $CH_2$—$CH$—$CH_3$, the position of groups A and B being statistical in nature, and the molecular weight of said macromonomer being equal to 3,000 g/mol.

Test No. 5

This test implements an inventive comb copolymer, whose molecular weight is equal to 55,000 g/mol and whose polymolecularity index is equal to 1.7, fully neutralized by sodium, and made up of, expressed as a percentage by weight of each of its components:
10% acrylic acid,
90% by weight of a macromonomer whose formula is (I) in which R represents the methacrylate group, R' represents hydrogen, m=71, n=31, and A designates the group $CH_2$—$CH_2$ and B designates the group $CH_2$—$CH$—$CH_3$, the position of groups A and B being statistical in nature, and the molecular weight of said macromonomer being equal to 5,000 g/mol.

In FIGS. 1 to 5, the solid lines represent the % of the remaining mass of the copolymers of tests #1 to 5 over time. The dotted curves represent the derivative of the solid curves.

This shows that the inventive copolymer has a resistance to thermal degradation much greater than that of the copolymer of the prior art: it may advantageously be used in a loaded plastic formulation, in order to improve its thermal stability.

Example 2

This example illustrates the implementation of an inventive copolymer and a copolymer according to the prior art, in a loaded PVC formulation: the purpose of the example is to demonstrate that the impact resistance and brightness of the part obtained after extrusion are kept in both situations, particularly by comparison to a formulation that does not contain any comb copolymer.

Composition of PVC Formulations

For each test A, B and C, the manufactured PVC formulations implement:
a PVC resin sold by the company ARKEMA™ as Lacovyl™ S110P,
titanium dioxide sold by the company KRONOS™ as Kronos™ 2200,
a thermal stabilizer sold by the company BARLOCHER™ as One Pack Baeropan™,
a lubricant sold by the company LAPASSE ADDITIVES CHEMICALS™ as Lacowax™ EP,
an organic shock-modifying "core-shell" additive sold by the company ARKEMA™ as Durastrength™ 320,
calcium carbonate in the form of powder, whose manufacture is explained above,
and potentially a comb copolymer.

The quantities used have been indicated in table 1.

Obtaining Dry Powders of Calcium Carbonate

We start by grinding an aqueous suspension of calcium carbonate, an Orgon calcite, so that 55% by weight of the particles have a diameter less than 1 μm as measured by a Sedigraph™ 5100 device sold by the company MICROMERITICS™, and to obtain a calcium carbonate equal to 75% by dry weight of its total weight.

The grinding takes place in the presence of 0.28% by dry weight, in comparison to the dry weight of calcium carbonate; a homopolymer of acrylic acid, whose molecular weight equal to 5,500 g/mol and neutralized by sodium and calcium (70%/30% by molar weight).

Next, 0.45% by dry weight of stearic acid, in comparison to the dry weight of calcium carbonate, is added to the suspension.

For tests B and C, we then add into the resulting aqueous suspension 0.7% by dry weight, in comparison to the dry weight of calcium carbonate:
the comb copolymer of the prior art according to test #1,
the inventive comb copolymer according to test #4.

For test A, the comb copolymer is not implemented.

The grinding protocol is well-known, and particularly described in the document FR 2,539,137.

The resulting aqueous suspensions of calcium carbonated are then dried into a powder using a Niro Minor Mobile 2000 dryer (sold by the company NIRO™) fitted with a fountain nozzle. The characteristics of this drying are a gas input temperature of 350° C., a gas output temperature of 100° C., ventilation open 99% of the way and air pressure of around 2 bars.

Manufacturing Dry Mixtures of PVC

For each of the tests, we begin by mixing the various components involved in the composition of thermoplastic materials. Such mixtures are done using a Loedige™ THK 10 mixer.

The PVC, the stabilization agents and the shock admixture are added into the chamber and are agitated at 2,600 revolutions per minute in order to obtain a temperature of 90° C.

The mineral load and the titanium dioxide are then added, and when the mixture reaches a temperature of 120° C., it is suddenly recooled by reducing the speed to a value of 1,500 revolutions per minute and circulating the water within the double housing.

The mixture is finally unloaded at a temperate of 35° C.

Extruding Dry Mixtures of PVC

All of the mixtures were extruded with a Thermoelectron Polylab™ system equipped with a twin-screw and a slot die (30 mm×3 mm).

The PVC parts are then calibrated to 15° C. in a bath of water and on an Yvroud system. The extrusion parameters are a temperature of the 3 zones equal to 175-180-190° C. and a screw speed of 30 revolutions per minute. The spinner is heated to 190° C.

Shock Resistance Measurement

The shock resistance measurements are taken in accordance with British Standard BS 7413: 2003. The measurements were averaged over groups of 10 test samples created with the Diadisc™ 4200 machine sold by MUTRONICT™.

The dataset appears in table 1.

TABLE 1

| Test no. | A | B | C |
|---|---|---|---|
| Prior Art/Invention (PA/IN) | PA | PA | IN |
| Lacovyl ™ | 100 | 100 | 100 |
| Kronos ™ 2200 | 5 | 5 | 5 |
| One Pack Baeropan ™ | 2.5 | 2.5 | 2.5 |
| Lacowax ™ | 0.05 | 0.05 | 0.05 |
| Durastrength ™ | 6 | 6 | 6 |
| Comb polymer according to the prior art | 0 | 8 | 0 |
| Inventive comb polymer | 0 | 0 | 8 |
| Impact (kJ/m$^2$) | 18.6 | 21.4 | 23.9 |

These findings demonstrate that the comb copolymers increase the impact resistance and brightness of the PVC part. They also demonstrate that the inventive comb copolymer does not alter these properties, in relation to the comb copolymer of the prior art: in fact, their performance under the invention is even observed to improve.

Measuring Optical Properties

The values L, a, and b, which are well-known to a person skilled in the art, are measured at 60° by means of a Tri-Gloss spectrophotometer sold by the company BYK-GARDNER™.

To do so, the change in these values is tracked for the test samples corresponding to tests B and C, by means of the test well-known to the person skilled in the art implementing a Werner Mathis oven whose temperature is set to 195° C., and which runs the sample through at a speed of 4 mm/minute.

Figure 1:
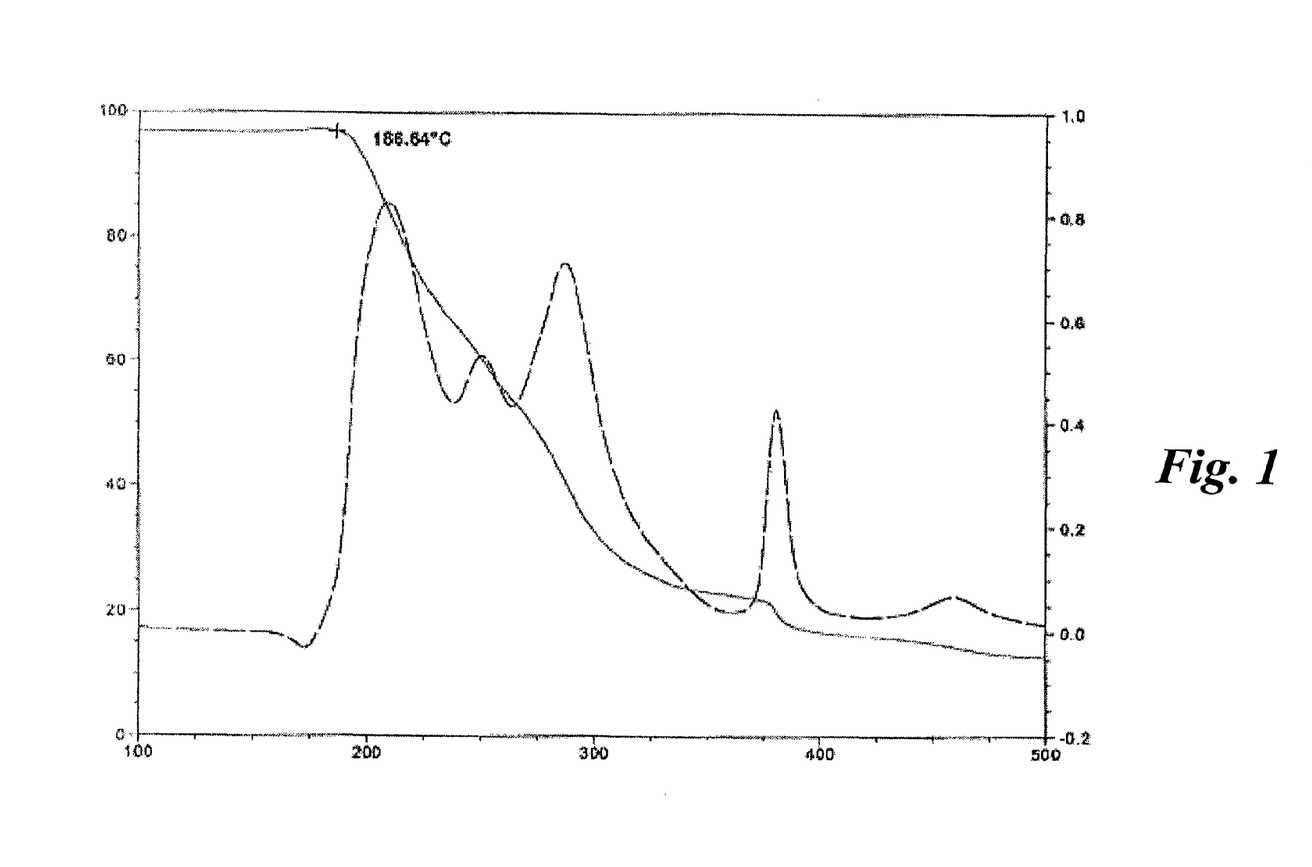
FIG. 1 is a graphical representation wherein the solid lines represent the % of the remaining mass of the copolymer of test #1 below, and the dotted curve represents the derivative of the solid curve.
Figure 2:
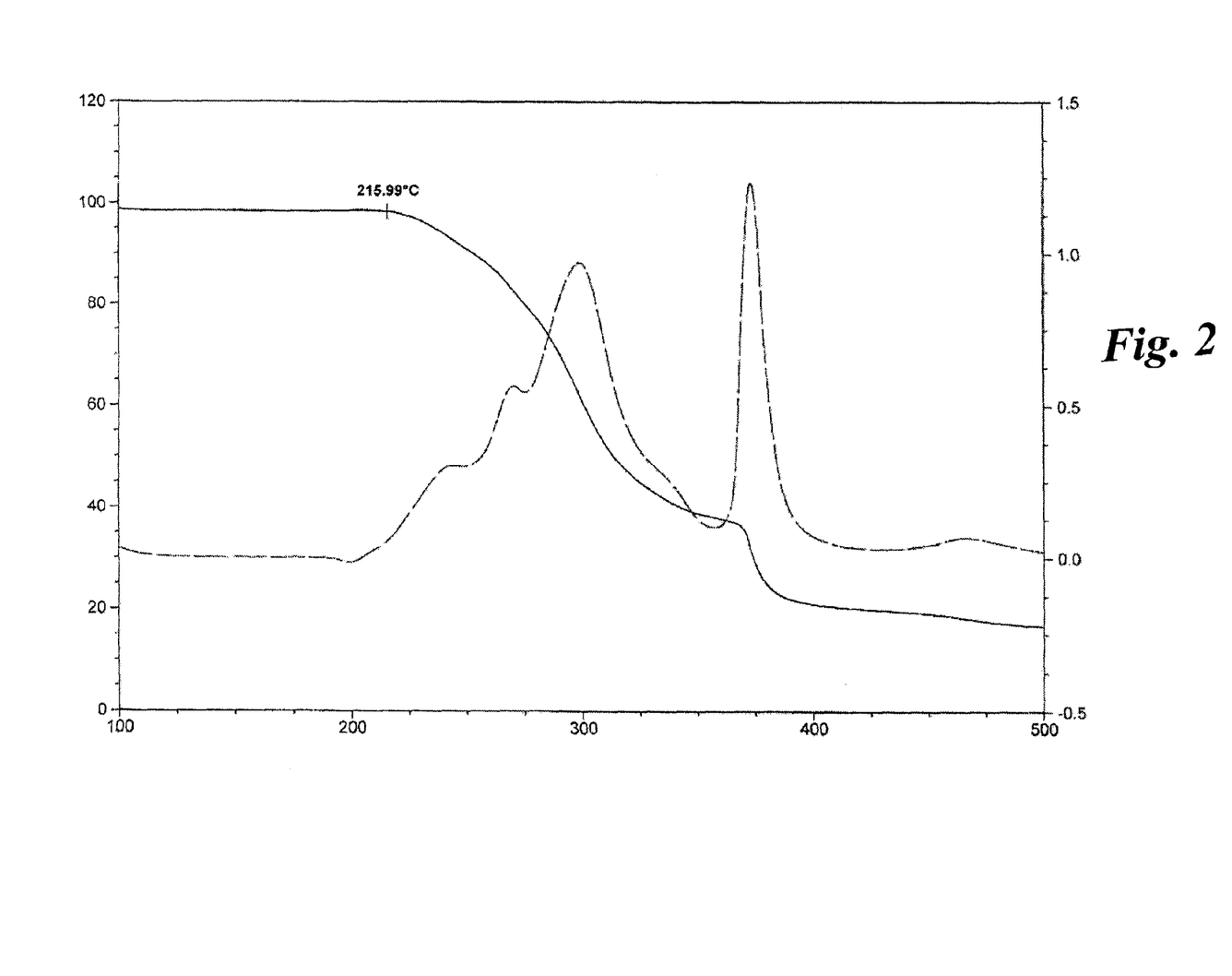
FIG. 2 is a graphical representation wherein the solid lines represent the % of the remaining mass of the copolymer of test #2 below, and the dotted curve represents the derivative of the solid curve.
Figure 3:
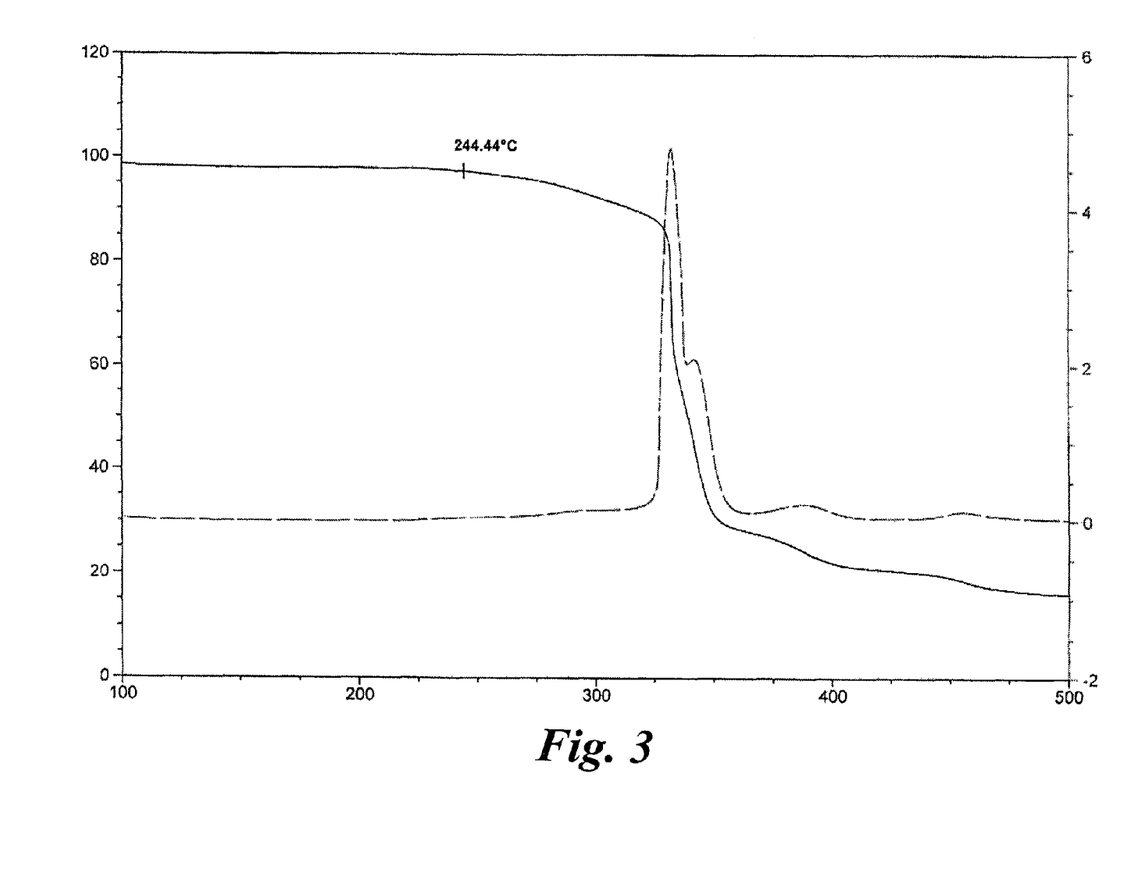
FIG. 3 is a graphical representation wherein the solid lines represent the % of the remaining mass of the copolymer of test #3 below, and the dotted curve represents the derivative of the solid curve.
Figure 4:
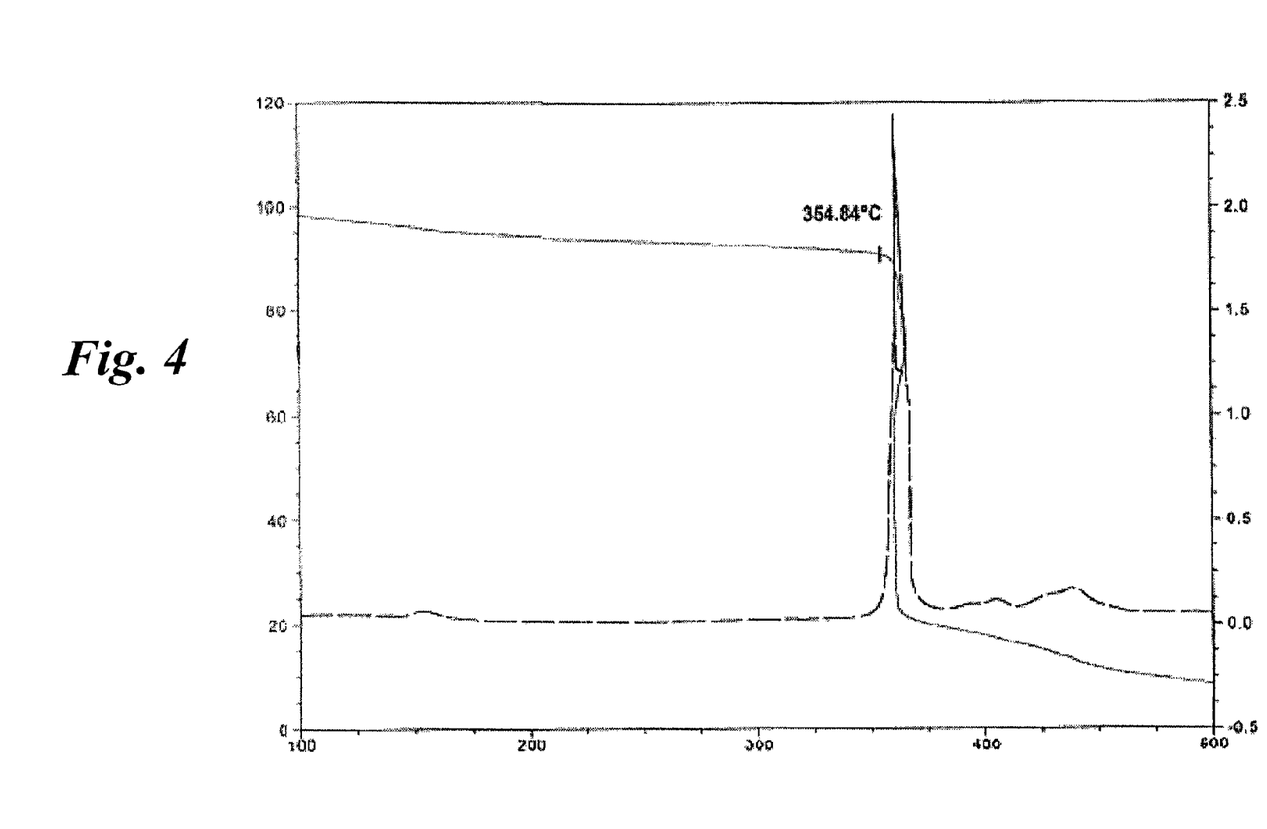
FIG. 4 is a graphical representation wherein the solid lines represent the % of the remaining mass of the copolymer of test #4 below, and the dotted curve represents the derivative of the solid curve.
Figure 5:
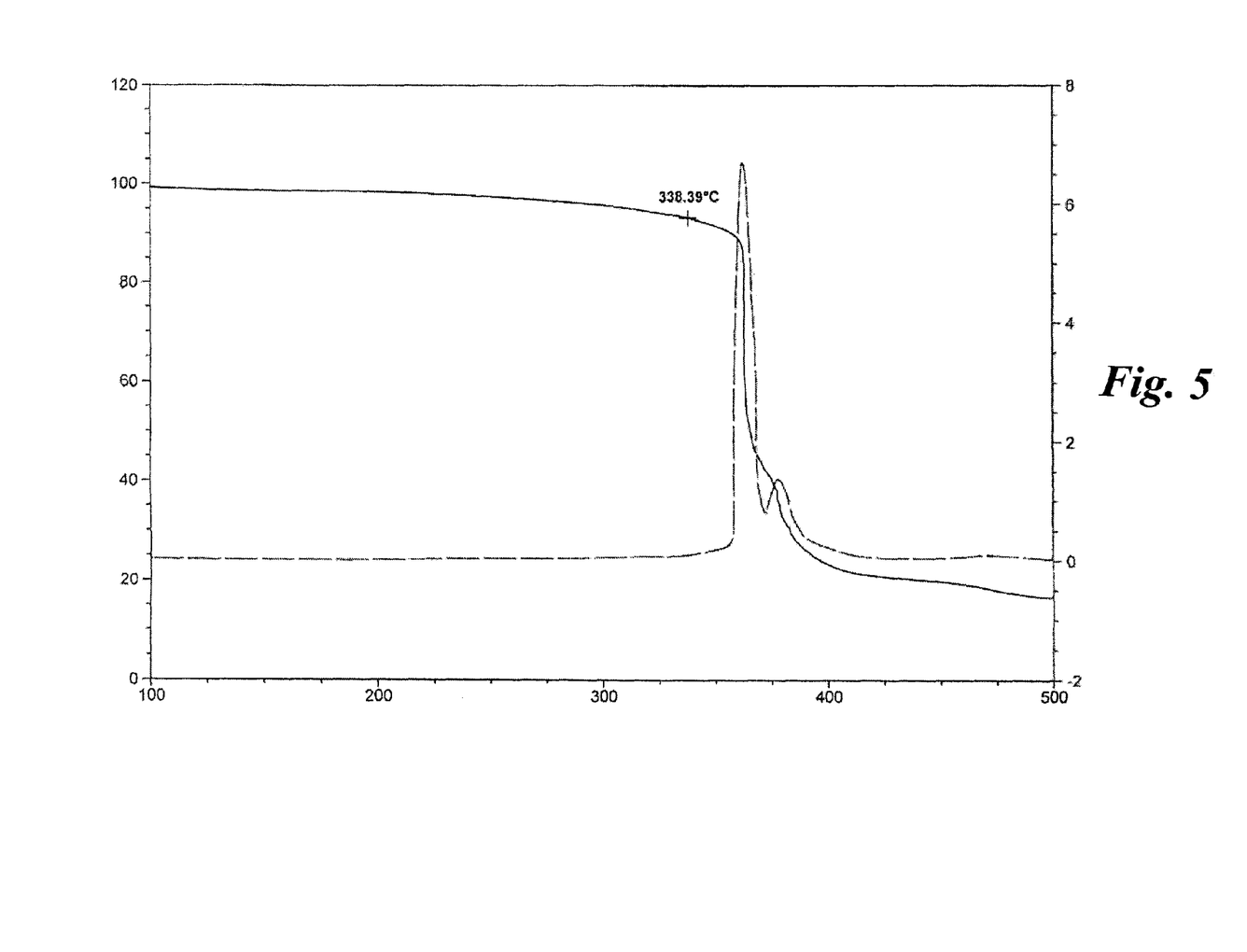
FIG. 5 is a graphical representation wherein the solid lines represent the % of the remaining mass of the copolymer of test #5 below, and the dotted curve represents the derivative of the solid curve.
Figure 6:
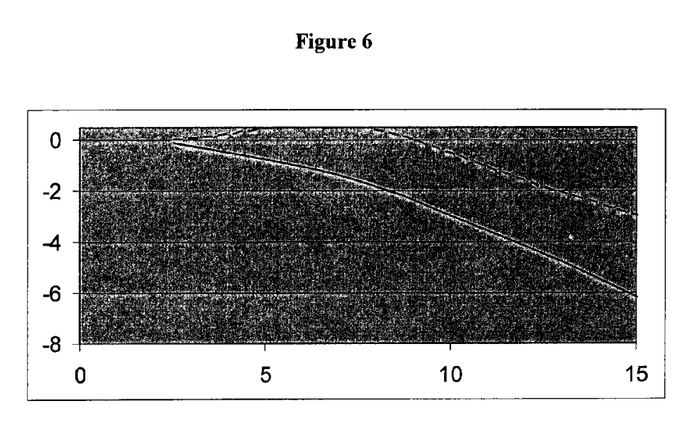
FIG. 6 is a graphical representation of the change in 'L' for loaded plastic according to test B, and containing the comb copolymer of the prior art (solid curve) and for the loaded plastic according to test C containing the inventive comp copolymer (dotted curve).
Figure 7:
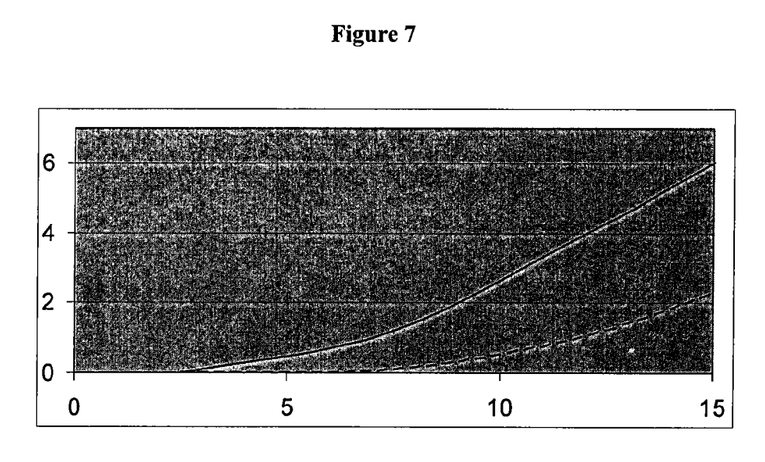
FIG. 7 is a graphical representation of the change in 'a' for loaded plastic according to test B, and containing the comb copolymer of the prior art (solid curve) and for the loaded plastic according to test C containing the inventive comp copolymer (dotted curve).
Figure 8:
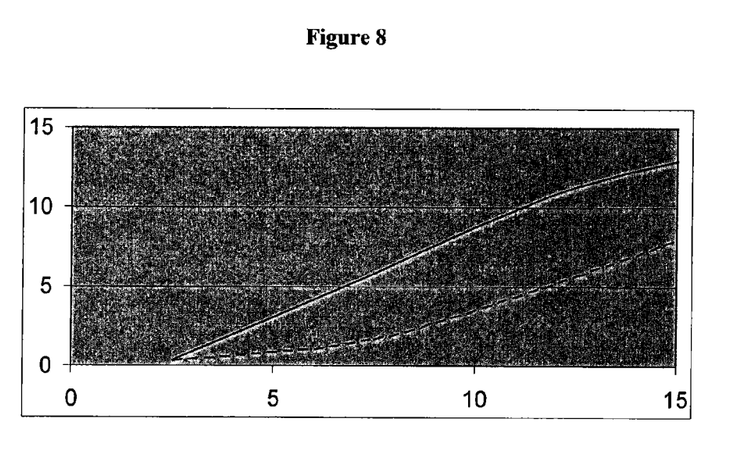
FIG. 8 is a graphical representation of the change in 'b' for loaded plastic according to test B, and containing the comb copolymer of the prior art (solid curve) and for the loaded plastic according to test C containing the inventive comp copolymer (dotted curve).

FIGS. 6, 7, and 8 respectively represent the change in L, a, and b for loaded plastic according to test B and containing the comb copolymer of the prior art (solid curve) and for the loaded plastic according to test C containing the inventive comb copolymer (dotted curve).

A much lower variation in parameters L, a, and b are observed for the invention.

Measuring the Hydrogen Chloride Released

For these same loaded plastics, their ability to release hydrogen chloride under the effects of temperature is determined. This measurement is performed according to the NF EN ISO 182-3 of December 2000.

Figure 9:
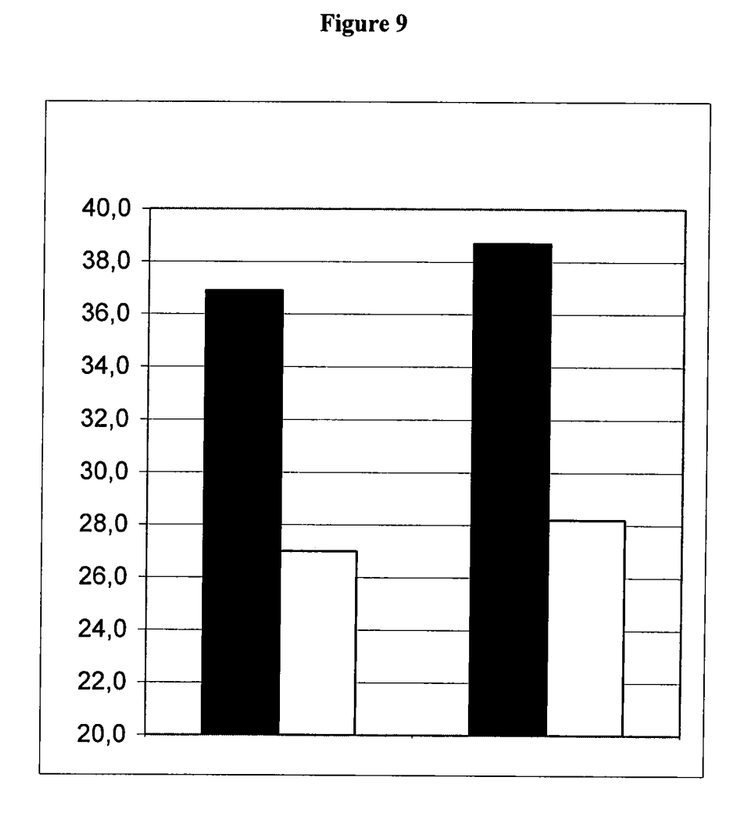

FIG. 9, for the loaded plastics according to tests B (2 rectangles on the left) and C (2 rectangles on the right), the time of the so-called induction periods in minutes (in black) and stability are depicted until a value set to 50 g-Siemens conductivity (in white) is reached.

The higher these times are, the less hydrogen chloride is released.

It is observed that the longest times are obtained for the inventive plastic formulation (2 rectangles on the right).

The invention claimed is:

1. A method for manufacturing a loaded plastic material having improved thermal stability, comprising:
preparing by radical copolymerization, a copolymer consisting of units obtained from:
a) a (meth)acrylic monomer, and
b) a macromonomer having the formula (I):

$$R-(A-O)_m-(B-O)_n-R' \qquad (I)$$

wherein:
m and n are non-zero whole numbers less than 150,
A and B refer to alkyl groups having 2 to 4 carbon atoms, wherein alkyl groups A are different from alkyl groups B, and the alkyl groups A and B are distributed in a block or statistical fashion,
R designates a polymerizable unsaturated function, and
R' represents hydrogen or an alkyl group having 1 to 40 carbon atoms;
wherein the radical copolymerization is a member selected from the group consisting of radical polymerization in a solution, radical polymerization in a direct or reverse emulsion, radical polymerization in a suspension or precipitation in solvents, radical polymerization in the presence of catalytic systems and transfer agents, and controlled radical polymerization; and
incorporating the copolymer formed into the loaded plastic material, wherein the plastic material comprises at least one plastic resin selected from the group consisting of thermoplastic resins and heat-setting resins, wherein when the plastic material comprises a thermoplastic resin, the thermoplastic resin is at least one member selected from the group consisting of halogenated resins, styrenic resins, acrylic resins, polyolefins, polycarbonate resins, unsaturated polyester resins, polyurethane resins, polyamide resins, and mixture of these resins, and wherein when the plastic material comprises a heat-setting resin, the heat-setting resin is at least one member selected from the group consisting of acrylic resins, phenoplasts, aminoplasts, and ethoxinlines.

2. The method according to claim 1, wherein the copolymer is incorporated into the loaded plastic material in an amount of from 0.05% to 5% of said copolymer by dry weight, in comparison to the dry weight of the load.

3. The method according to claim 2, wherein the copolymer is incorporated in an amount of from 0.1% to 3%.

4. The method according to claim 3, wherein the copolymer is incorporated in an amount of from 0.1% to 1%.

5. The method according to claim 1, where the method comprises at least one step of incorporating said copolymer into the loaded plastic material:
1. in the form of a dry powder, resulting from the steps of:
grinding and/or dispersing the load in an aqueous medium in the presence of said copolymer, and, optionally, in the presence of at least one other wet-grinding agent and/or at least one other dispersing agent, drying the obtained dispersion and/or aqueous suspension of mineral or carbonated material, optionally adding said polymer, processing and then optionally classifying the obtained powder, 2. and/or in the form of a dry powder, resulting from the steps of:
   dry-grinding the load in the presence of said copolymer, and optionally in the presence of at least one other dry grinding agent,
   processing and optionally classifying the obtained powder, 3. and/or in the form of a dry powder, resulting from the following steps:
   adding said copolymer into a dispersion and/or into an aqueous suspension containing the load,
   drying the dispersion and/or aqueous suspension of the load, optionally adding said copolymer, processing and then optionally classifying the obtained powder, 4. and/or in the form of a dry powder resulting from drying said copolymer, 5. and/or in the form of a dry powder, resulting from the following steps:
   adding said copolymer into a suspension and/or emulsion of at least one additive chosen from among at least one member selected from the group consisting of thermal stabilizers, UV stabilizers, lubricants, rheology modifiers, and impact modifiers that are organic in nature,
   drying the obtained suspension and/or emulsion, optionally in the presence of said copolymer, and then optionally classifying the obtained powder.

6. The method according to claim 1, wherein the load is a mineral or organic load.

7. The method according to claim 6, wherein the load is a mineral load selected from the group consisting of natural calcium carbonate, synthetic calcium carbonate, dolomites, limestone, kaolin, talc, titanium dioxide, aluminum trihydroxide, mica, carbon-black, and silica.

8. The method according to claim 7, wherein the load is natural or synthetic calcium carbonate.

9. The method according to claim 8, wherein the load is natural calcium carbonate.

10. The method according to claim 1, wherein the plastic resin is a thermoplastic resin selected from the group consisting of PVC, chlorinated polyvinyl chloride (CPVC), poly(vinylidene fluoride) (PVDF), high-impact styrene-butadiene (HIPS), styrene-acrylonitrile resins, acrylate-butadiene-styrene resins, methyl methacrylate styrene copolymers, methyl polymethacrylate, polyethylenes, polypropylenes, polyethylene terephthalate and polybutylene terephthalate.

11. The method according to claim 10, wherein the plastic resin is a thermoplastic resin selected from the group consisting of PVC, chlorinated polyvinyl chloride (CPVC), poly(vinylidene fluoride) (PVDF), methyl poly methacrylate, polycarbonate resins, polyethylene terephthalate and polybutylene terephthalate.

12. The method according to claim 11, wherein the thermoplastic resin is PVC.

13. The method according to claim 1, wherein the plastic resin is a heat-setting resin selected from the group consisting of acrylic resins, phenoplasts, aminoplasts, and ethoxinlines.

14. The method according to claim 1, wherein the plastic resin is a heat-setting resin and is a member selected from the group consisting of epoxides, unsaturated polyesters, polyurethanes, and alkyds.

15. The method according to claim 1, wherein A and B each independently have 2 to 3 carbon atoms.

16. The method according to claim 15, wherein A is $CH_2$—$CH_2$ and group B is $CH_2$—$CH(CH_3)$—.

* * * * *